(12) United States Patent
Juven et al.

(10) Patent No.: US 10,499,264 B1
(45) Date of Patent: Dec. 3, 2019

(54) ROLE SELECTION METHOD IN WIRELESS COMMUNICATION NETWORKS

(71) Applicant: WIREPAS OY, Tampere (FI)

(72) Inventors: Ville Juven, Tampere (FI); Juho Pirskanen, Kangasala (FI); Jari Ruohonen, Tampere (FI)

(73) Assignee: WIREPAS OY, Tampere (FI)

( * ) Notice: Subject to any disclaimer, the term of this patent is extended or adjusted under 35 U.S.C. 154(b) by 0 days.

(21) Appl. No.: 15/989,993

(22) Filed: May 25, 2018

(51) Int. Cl.
*H04Q 7/00* (2006.01)
*H04W 24/02* (2009.01)
*H04W 40/02* (2009.01)
*H04L 12/751* (2013.01)

(52) U.S. Cl.
CPC .......... *H04W 24/02* (2013.01); *H04L 45/02* (2013.01); *H04W 40/02* (2013.01)

(58) Field of Classification Search
CPC ........ H04L 45/00; H04L 45/20; H04W 40/24; H04W 74/08; H04W 84/18; H04W 88/06; H04W 28/14; H04W 72/1215; H04W 84/12; H04W 40/22; H04W 40/242; H04W 40/248; H04W 50/46; H04W 88/04
See application file for complete search history.

(56) References Cited

U.S. PATENT DOCUMENTS

| | | | | |
|---|---|---|---|---|
| 2005/0117525 A1* | 6/2005 | Poustchi | ........... | H04L 29/12264 370/254 |
| 2005/0282494 A1* | 12/2005 | Kossi | ................... | H04W 88/06 455/41.2 |
| 2007/0195728 A1* | 8/2007 | Chen | ....................... | H04L 45/00 370/328 |
| 2008/0170550 A1* | 7/2008 | Liu | ....................... | H04L 49/602 370/338 |
| 2013/0258872 A1* | 10/2013 | Drake | ................ | H04L 41/0833 370/252 |
| 2014/0105136 A1* | 4/2014 | Tellado | ................ | H04L 5/0058 370/329 |
| 2015/0319235 A1* | 11/2015 | Liu | ................... | H04L 29/08072 709/204 |

FOREIGN PATENT DOCUMENTS

WO  2010-039166   4/2010
WO  2011/083389 A1  7/2011

OTHER PUBLICATIONS

GB Search Report for Application No. GB1808732.0, dated Oct. 24, 2018.
European Search Report for Application No. 19 17 6116 dated Aug. 13, 2019.

* cited by examiner

*Primary Examiner* — Jung Liu
(74) *Attorney, Agent, or Firm* — Young & Thompson

(57) ABSTRACT

The invention relates to a wireless communication system (100), comprising a plurality of radio nodes, each being able to operate at least as a router node (104) or as a non-router node (104). Each of the plurality of radio nodes is configured to: detect density of the router nodes (104) within its neighbourhood, and make a decision based on the detected density whether to operate as a router node (104) or as a non-router node (106). The invention relates also to a role selection method and a radio node device (104, 106, 500) for the wireless communication system (100).

16 Claims, 8 Drawing Sheets

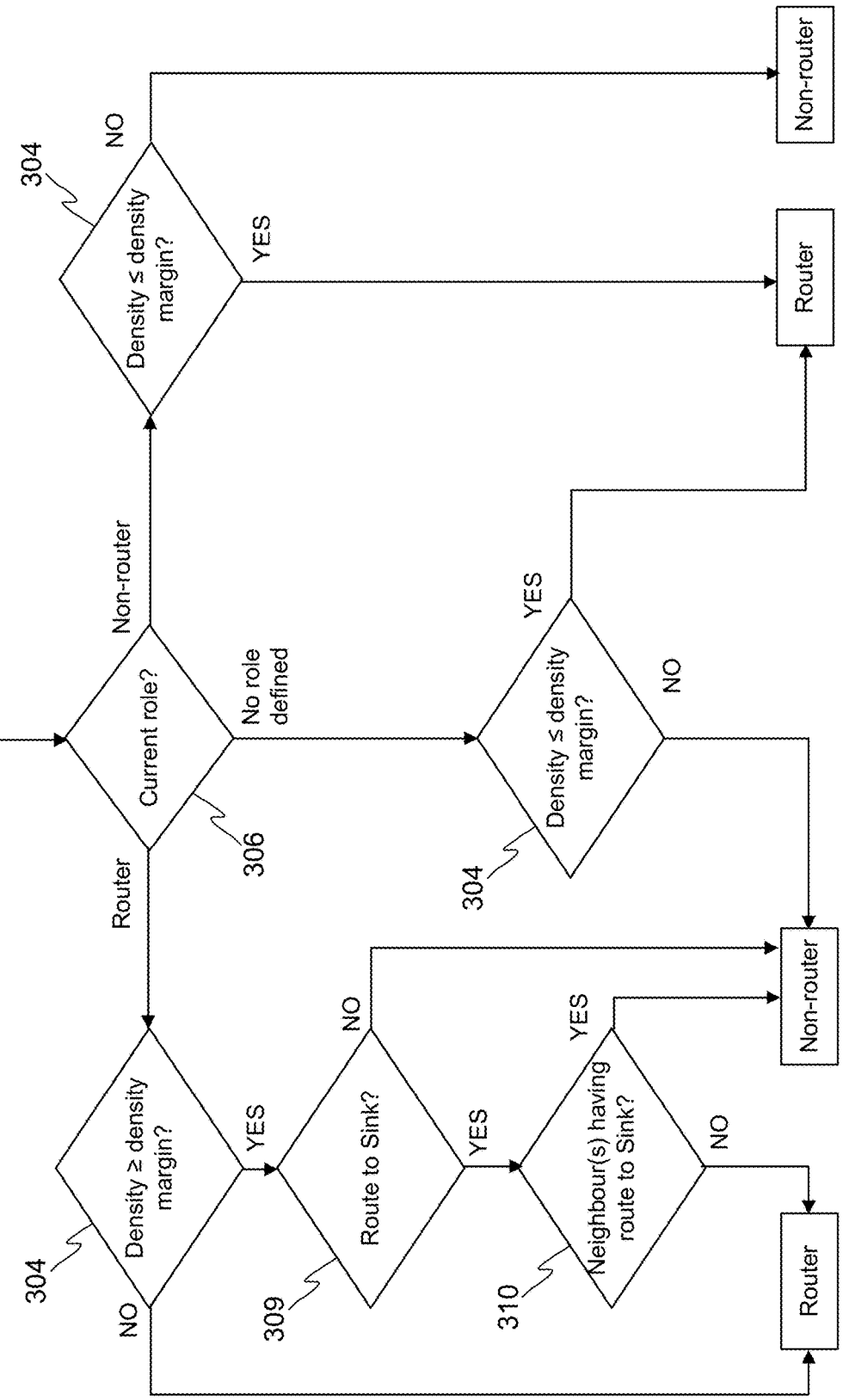

ROLE SELECTION METHOD IN WIRELESS COMMUNICATION NETWORKS

TECHNICAL FIELD

The invention concerns in general the technical field of wireless communication networks. Especially the invention concerns role selection of nodes in wireless communication networks.

BACKGROUND OF THE INVENTION

Wireless communication networks, e.g. wireless mesh networks, are composed of multiple, even hundreds or thousands of radio nodes (later referred as "nodes") that communicate with each other over two or more radio interfaces. To support the various functions of such wireless communication networks, the nodes typically need to operate in different roles. One or more nodes of the network operate in sink role, i.e. they are part of gateways to other networks, e.g. Internet, and deliver data in and from the wireless communication network. The rest of the nodes of the network may be divided into routers and non-routers depending on if they need to participate in data forwarding. Routers maintain the connectivity of the network and forward data of other nodes when needed. Non-routers may transmit their own data and receive data directed for them, but typically they do not route data of other nodes.

The wireless communication network may comprise sensor devices that produce data, which is monitored over the Internet. Each sensor device is equipped with one or more radio interfaces and various sensors and they operate as nodes of the wireless communication network. The radio interface of each node is used to deliver the data towards the sink node or any other node in the network. Even if a single node cannot directly reach the sink node, the network formed between the nodes takes care of routing the data and control messages to the desired destination. A routing protocol implemented in each node chooses the path to the sink(s). Similarly, there may be data that is delivered, over multiple radio links, from the sink node to the node(s) or between the nodes inside the wireless communication network.

The wireless communication networks may need to adapt into different types of environments, device densities, topologies, and arbitrary changes in any of the previous.

According to one prior art solution nodes of a wireless communication network may be divided into active, i.e. relaying, and super-saving roles. A root node generates a routing path through the network, i.e. selects the active nodes, and the active nodes on the path are not allowed to change their roles to super-saving role. The selection is repeated periodically. The method is based on centralized decision making by the root node, which may reduce complexity of the nodes. One drawback of the prior art solution is that it does not address the local availability of the active devices around the mesh network, e.g. in case new terminals would like to join the network (but are in the radio coverage of super-saving terminals only). Additionally, updating all router information from central node can cause extensive signalling especially when number of nodes is high.

According to another prior art solution selection of parent routing nodes in a hierarchical wireless mesh network may be performed by exchanging path metric information. Signal quality (e.g. signal-to-noise ratio and/or received signal strength) may be measured to provide the path metric information and the selections are made based on this information. Hence, in this case there is no real role selection or role is selected individually for each transmission to optimize the route path to increase the efficiency of the routing. However, all nodes need to exchange path metric information and be ready for being part of data path.

SUMMARY OF THE INVENTION

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a wireless communication system, a role selection method, a radio node device, a computer program, and a computer-readable medium. Another objective of the invention is that the wireless communication system, the role selection method, the radio node device, the computer program, and the computer-readable medium improve adaptivity of a wireless communication system.

The objectives of the invention are reached by a wireless communication system, a role selection method, a radio node device, a computer program, and a computer-readable medium as defined by the respective independent claims.

One embodiment is a wireless communication system comprising a plurality of radio nodes, each being able to operate at least as a router node or as a non-router node. Each of the plurality of radio nodes is configured to detect density of the router nodes within its neighbourhood. In addition, each of the plurality of radio nodes is configured to make a decision based on the detected density whether to operate as a router node or as a non-router node.

One embodiment is a radio node device (apparatus) for wireless communication system in accordance with the previous embodiment. The radio node device is able to operate at least as a router node or as a non-router node. The radio node device comprises a microcontroller and a radio transceiver. The radio node device is configured to detect, by the microcontroller, density of the router nodes within its neighbourhood. In addition, the radio node device is configured to make a decision, by the microcontroller, based on the detected density whether to operate as a router node or as a non-router node.

One embodiment is a role selection method for the radio node device in a wireless communication system in accordance with the previous embodiments. The method comprises detecting, by the microcontroller, density of the router nodes within its neighbourhood. In addition, the method comprises making a decision, by the microcontroller, based on the detected density whether to operate as a router node or as a non-router node.

One embodiment is a computer program (software) for role selection by means of the radio node device in a wireless communication system in accordance with the previous embodiments, when run in the radio node device (computer).

The program comprises a detection code for detecting, by the microcontroller, density of the router nodes within its neighbourhood. In addition, the program comprises a decision code for making a decision, by the microcontroller, based on the detected density whether to operate as a router node or as a non-router node.

One embodiment is a tangible non-volatile computer readable medium comprising the computer program in accordance with the previous embodiment. The program for role selection is performed by means of the radio node device in a wireless communication network in accordance with the previous embodiments, when run in the radio node device. The program comprises a detection code for detecting, by the microcontroller, density of the router nodes within its neighbourhood. In addition, the program comprises a decision code for making a decision, by the microcontroller, based on the detected density whether to operate as a router node or as a non-router node.

Further embodiments are disclosed in the dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIGS. 3A-3F schematically illustrate examples of a role selection method according to the invention.

DESCRIPTION OF THE EXEMPLIFYING EMBODIMENTS

Figure 1:
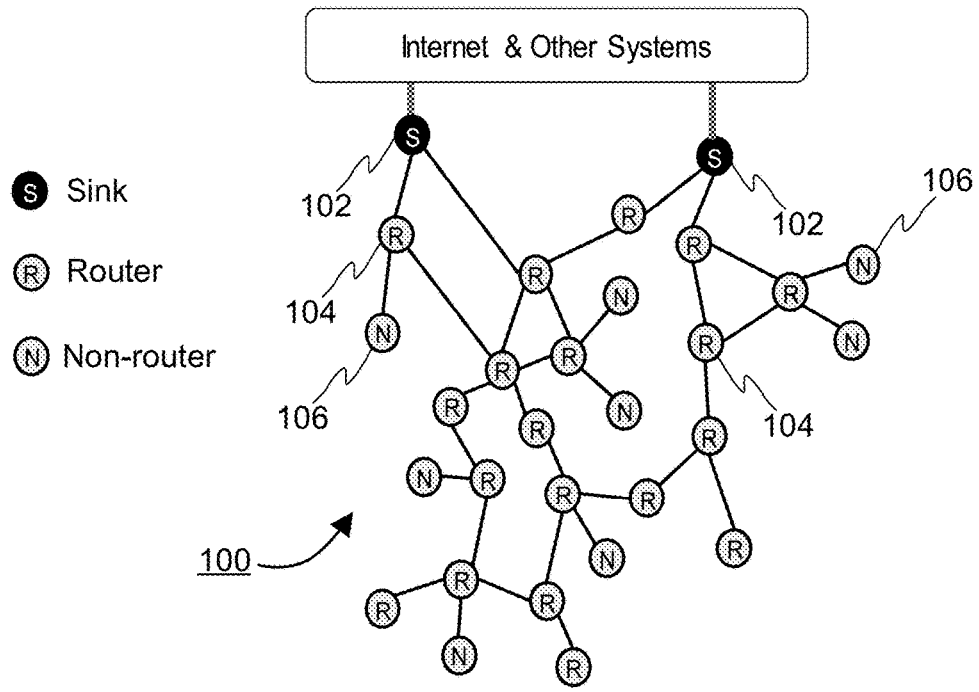
FIG. 1 illustrates schematically an example of a wireless communication network.

FIG. 1 illustrates an example wireless communication network 100, which may be e.g. a wireless mesh network (WMN). The WMN may be e.g. a wireless sensor network (WSN). The wireless communication in the network 100 may be based on e.g. Bluetooth Low Energy (BLE), IEEE 802.15 standard, IEEE 802.11 standard, or other radio protocol.

The network 100 may comprise a plurality of radio nodes. The plurality of nodes may be able to operate in different roles. The network comprises at least one node operating in a sink role 102, i.e. it is part of gateway to other networks, e.g. Internet, and delivering data in and from the network 100. The rest of the nodes of the plurality of nodes may be divided into router nodes 104 and non-router nodes 106 depending on if they need to participate in data forwarding. The operation as a router node 104 comprises capability for receiving data from at least one other node and transmitting the received data to at least one other node. The router nodes 104 maintain the connectivity of the network and forward data of other nodes when needed. The non-router nodes 106 may transmit their own data and receive data directed for them, but typically they do not route data of other nodes. Each of the plurality of nodes of the network 100 is able to operate at least as a router node or as a non-router node. Typically, a network 100 may be such that all nodes 104, 106 cannot communicate directly with the sink node 102 due to extensive distance between nodes 102, 104, 106, and limited radio range, whereupon it is needed multi-link (multi-hop) communication between a node 104, 106, and the sink 102.

The network 100 may need to adapt into different types of environments, device densities, topologies, and arbitrary changes in any of the previous. One key function for the adaptivity of the network 100 is role selection, i.e. selection of which nodes should be router nodes 104 and which nodes should be non-router nodes 106. The network 100 needs to deliver data, but not every node is needed for routing, at least not all the time. The router role may have some drawbacks on both node and network level, for example:

Devices that route traffic of other devices in the network 100 consume more power than those not participating routing/forwarding. At least part of the nodes in wireless communication networks typically have limited energy resources (e.g. batteries), so they should avoid routing activities if it is not essential for supporting the dataflow of the network 100;

Superfluous number of router nodes 104 does not add data delivery capacity to the network 100, but it may decrease it because of redundant signalling and collisions in radio transmissions; and Superfluous number of route nodes 104 may cause extra complexity for route calculations, and additional related signalling.

Figure 2:
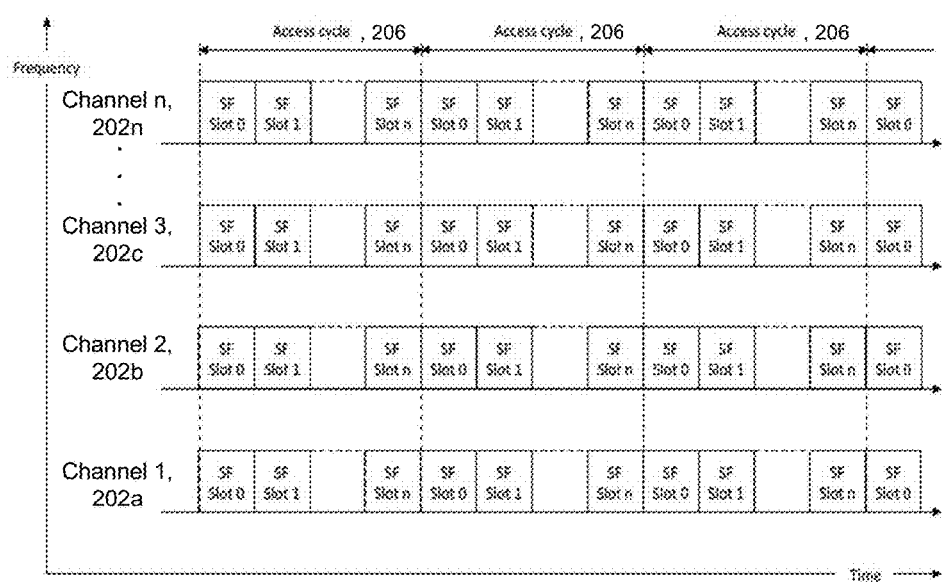
FIG. 2 illustrates an example of a Frequency-Time Division Multiple Access (FTDMA) table.

FIG. 2 illustrates an example of a Frequency-Time Division Multiple Access (FTDMA) table that is composed of multiple frequency channels 202a-202n. All of the multiple frequency channels 202a-202n are divided into superframe (SF) time slots. A repeated sequence of n SF slots is called access cycle 206. The SF start times are synchronized over the frequency channels 202a-202n. Each router node 104 may manage one SF slot in each access cycle and transmits a beacon message in the beginning of the SF slot. The beacon message may comprise information about the transmitting node and SF occupations visible for it.

FIGS. 3A-3F schematically illustrate examples of a role selection method according to the invention. At least one objective of the role selection method is to optimize the number of router nodes 104 of the network 100, which in turn allows efficient usage of spectrum recourses. The role selection method is described next by referring to one node (device). However, each of the plurality of radio nodes 104, 106 of the network 100 may perform the role selection method steps independently.

At a step 302 the node detects density of router nodes 104 within its neighbourhood, i.e. within its radio range. The terms "neighbour(s) of a node" and "neighbourhood of a node" mean one or more nodes whose radio transmissions may be detected by the receiving node. An extended meaning of the term "neighbourhood" takes into account the neighbours of the neighbour of the node, i.e. two-hop neighbourhood. As an example, in a frequency-time-slotted system, the density of the router nodes 104 may be defined as a percentage of the occupied SF slots in the FTDMA table, because each router node 104 reserves one SF slot as discussed above. For example, the density of router nodes 104 may be defined as a ratio between number of occupied SF slots per access cycle 206 and number of all SF slots (i.e.

the maximum number of router nodes) per access cycle 206 in the FTDMA table. The number of all SF slots depends on the used SF and access cycle lengths and the number of available frequency channels 202a-202n. The number of all SF slots may be fixed through the network 100. Alternatively, the number of all SF slots may vary. According to one example, there may be four frequency channels 202a-202d and four SFs per each channel 202a-202d, i.e. the number of all SFs is 16. The number of occupied SFs per frequency channel may be, e.g. 2, 4, 1 and 3, i.e. the total number of occupied SFs is 10. Thus, the density in this example may be defined to be 0.625 (62.5%). Each node may detect its own view of the number of occupied SF slots by listening directly to all the frequency channels 202a-202n for the beacon messages transmitted by other nodes, i.e. one link neighbourhood, and/or gathering occupation information formed by other nodes from the beacon messages transmitted by the other nodes, i.e. two link neighbourhood. Above the detection of the density of the router nodes 104 is described for a frequency-time-slotted system. However, the role selection method according to the invention is not limited to the above frequency-time-slotted systems and the role selection method may be implemented in any other systems and the density of the router-nodes may be detected by using any detection method suitable for the system in question.

Above, in the frequency-time-slotted system example, the maximum amount of router nodes 104 is defined by the maximum amount of SF slots. In other systems, the maximum router node 104 amount may be defined differently, for example it may be pre-defined value or detected according to available radio spectrum resources. The available radio spectrum resources may be e.g. whitelisted frequency channels and/or time periods free from interference.

In addition, the definition of density may be simplified as the number of detected router nodes 104. For example, if a node detects more than a predefined number of router nodes (e.g. 4), it will choose a non-router role. The drawback of this method is the lack of scaling with different spectrum resource situations. The benefit is that the method may be used as a fall-back method, when the overall spectrum resources, i.e. the maximum number of router nodes are unknown.

At a step 304 the node makes a decision based on the detected density whether to operate as a router node 104 or as a non-router node 106. To make the decision of the possible role change the detected density may be compared to a density margin. The density margin may be a predefined limit defining a desired density of router nodes 104 throughout the network 100, e.g. a desired occupation level of SFs comprising beacon transmission. The desired density may be e.g. a density of router nodes 104 providing optimum operation of the network 100. According to one embodiment of the invention the density margin may have a common value throughout the network, i.e. the density margin is fixed for all nodes within the network 100. Alternatively, the density margin may be different for one or more nodes within the network 100. Furthermore, according to one embodiment of the invention the density margin may be scaled with one or more hysteresis values to mitigate unnecessary role changes.

The decision whether to change the role or not may depend on the current role of the node. Furthermore, the scaling of the density margin may depend on the current role of the node, e.g. the one or more hysteresis values may be added to or subtracted from the density margin depending on the current role of the node. In FIGS. 3A-3F the dependency of the current role of the node is presented at a step 306, wherein the current role of the node is defined, i.e. router, non-router, and no role defined, and the decision whether to operate as a router node or as a non-router node depends on the current role of the node.

According to one example the density margin may be set to 70% and the hysteresis value may be predefined as ±5% depending on the current role of the node in the network 100, e.g. +5% for router node 104 and −5% for non-router node 106. These result in the following role changes:
1) If a node is currently a router node 104, it will:
   a. select non-router role if the detected density 75%, or
   b. otherwise it stays in the router role
2) If a node is currently a non-router node 106, it will:
   a. select router role, if the detected density 65%, or
   b. otherwise it stays in the non-router role
3) If a node has no prior role information or default role, it will:
   a. select router role, if the detected density 70% (density margin without scaling with hysteresis), or
   b. otherwise it selects the non-router role.

The values for the density margin and the hysteresis values used in the above example are only non-limiting examples and any other values for the density margin and the hysteresis values may be used.

Figure 3A:
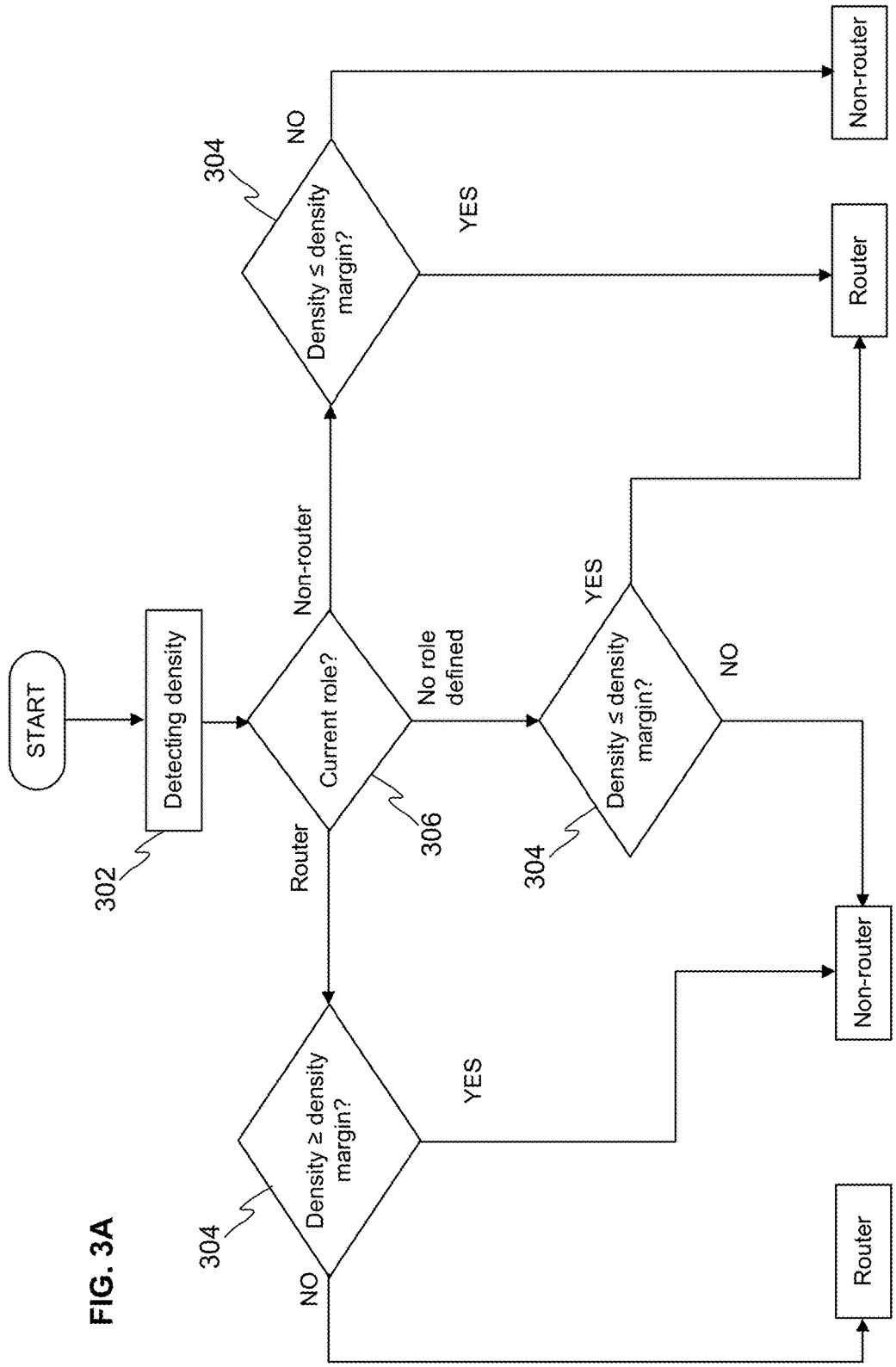
Figure 3B:
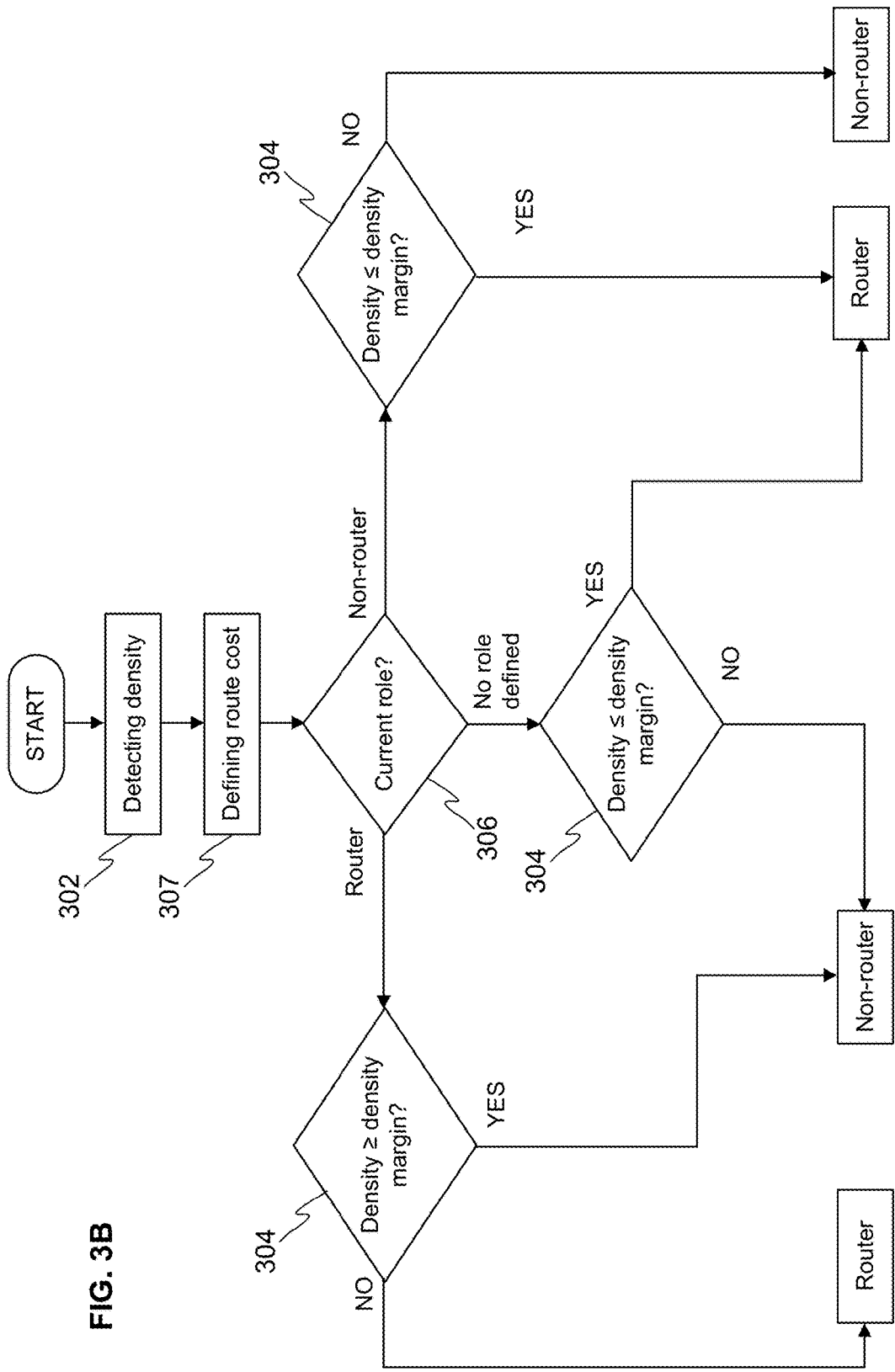

Alternatively or in addition, according to one embodiment of the invention the density margin may be scaled with a node specific route cost, decreasing or increasing a probability of the node to choose the router role. FIG. 3B schematically illustrates an example of the role selection method according to the invention, wherein at step 307 the node defines the route cost. The steps 302 and 307 may be performed also in reversed order, i.e. the node may alternatively define first the route cost and then detect the density of the router nodes within its neighbourhood.

A probability of the node to choose the router role decreases, when the route cost increases. The route cost defines a quality of the route, e.g. in terms of latency and/or power consumption. The route cost may be based on various measurable criteria, e.g. as number of radio links to the sink node 102. The radio links and the nodes on the route may be qualified using at least the following metrics or their combination:
cumulated energy resources of the nodes on the route, e.g. are the nodes mains or battery powered and what is the battery level;
energy resources of the nearest nodes, i.e. does the node have more battery left than its neighbour nodes;
cumulated link quality (e.g. packet error rate, received signal strength, cumulated value) on the route;
cumulated latency (e.g. propagation delay) on the route.

The route cost may be normalized, e.g. to values between 0 and 10% such that the higher the route cost is the higher is the normalized value. Furthermore, if more than one of the above metrics are combined into the route cost, one or more of them may also be weighted more than the others.

According to one example the density margin may be set again to 70%, the hysteresis value may be predefined again as ±5% depending on the current role of the node in the network 100, e.g. +5% for a router node 104 and −5% for a non-router node 106, and the route cost may be normalized to ±5% depending on the current role of the node in the network 100, e.g. +5% for a router node 104 and −5% for a non-router node 106. These result in the following role changes:
1) If a node is currently a router node 104, it will:
   a. select non-router role if the detected density 80%, or b. otherwise it stays in the router role 2) If a node is currently a non-router node 106, it will:
   a. select router role, if the detected density 60%, or
   b. otherwise it stays in the non-outer role 3) If a node has no prior role information or default role, it will:
   a. select router role, if the detected density 70% (density margin without scaling with hysteresis and route cost), or
   b. otherwise it selects the non-router role.

The values for the density margin, the hysteresis values, and route cost used in the above example are only non-limiting examples and any other values for the density margin, the hysteresis values, and route cost may be used.

Figure 3C:
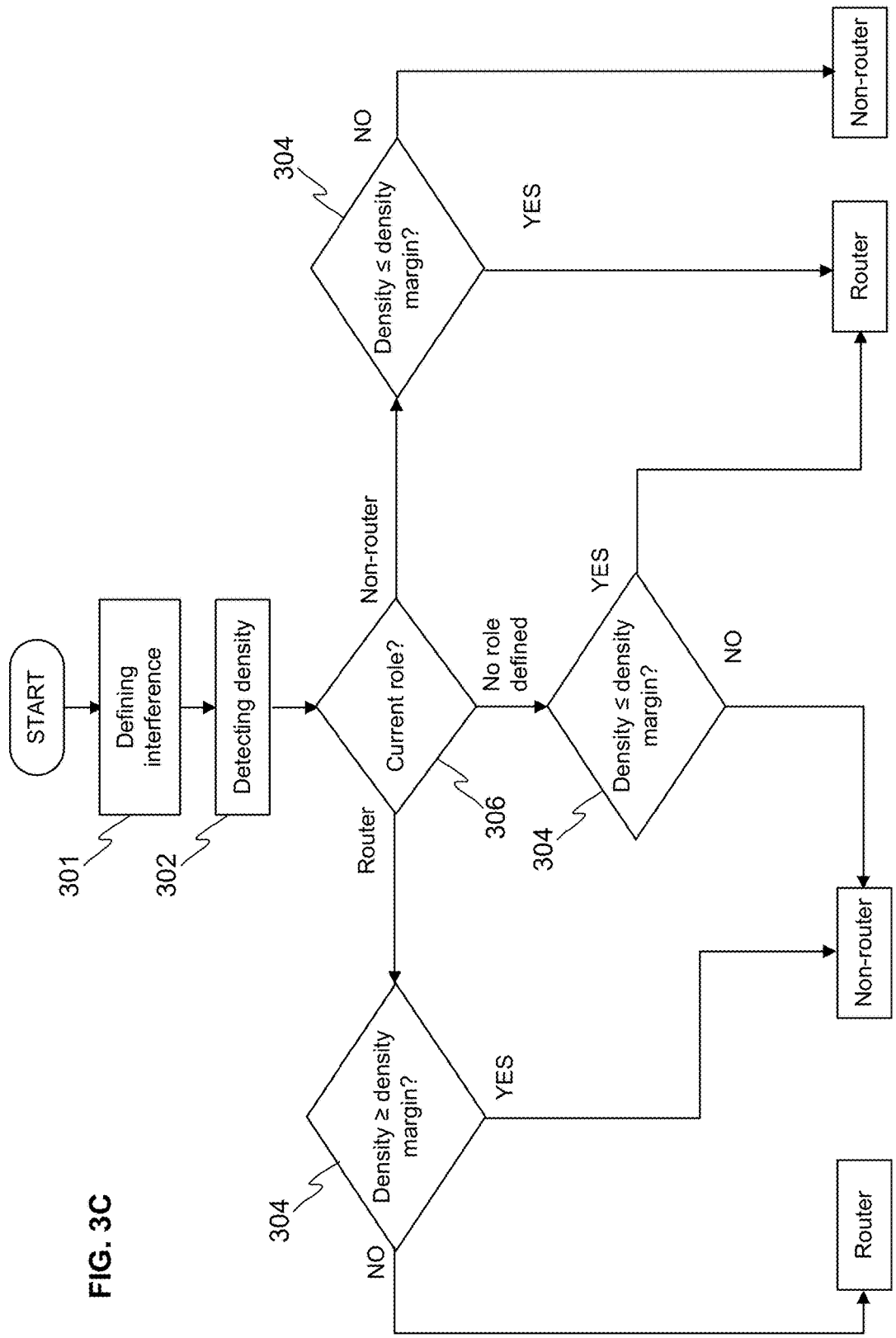

Alternatively or in addition, according to one embodiment of the invention the density margin may be scaled according to radio interference within the neighbourhood of the node, decreasing or increasing a probability of the node to choose the router role and decreasing or increasing the router density within the neighbourhood of the node. Additionally, the density margin may have a minimum limit so that even under lot of interference there will still be sufficient amount routers within the neighbourhood of the node. FIG. 3C schematically illustrates an example of the role selection method according to the invention, wherein at step 301 the node defines the radio interference within its neighbourhood.

A probability of the node to choose the router role decreases, when the amount of interfered frequency channels within the neighbourhood of the node increases. The interference on a frequency channel may be measured for example by Sampling received power;
Using clear channel assessment or listen-before-talk functionality;
Measuring packet error rate.

Using these metrics, a frequency channel quality may be measured, and the frequency channel may be whitelisted or blacklisted.

According to one example, if there are 40 frequency channels in use and 4 router nodes 104 allowed per frequency channel the maximum number of router nodes will be 160 (40 frequency channels times 4 router nodes 104 per frequency channel). If half of these frequency channels are interfered so heavily, that communication in these frequency channels is of low quality or does not work, there are only 20 usable frequency channels. In this situation, the maximum router node 104 amount would be 80 (20 frequency channels time 4 routers per frequency channel) and the density margin may be set to 50% (80/160). The hysteresis value may be predefined again as ±5% depending on the current role of the node in the network 100, e.g. +5% for a router node 104 and −5% for a non-router node 106. These result in the following role changes:

1) If a node is currently a router node 104, it will:
   a. select non-router role if the defined density 55%, or
   b. otherwise it stays in the router role 2) If a node is currently a non-router node 106, it will:
   a. select router role, if the defined density 60%, or
   b. otherwise it stays in the non-router role 3) If a node has no prior role information or default role, it will:
   a. select router role, if the defined density 50%, or
   b. otherwise it selects the non-router role.

Figure 3D:
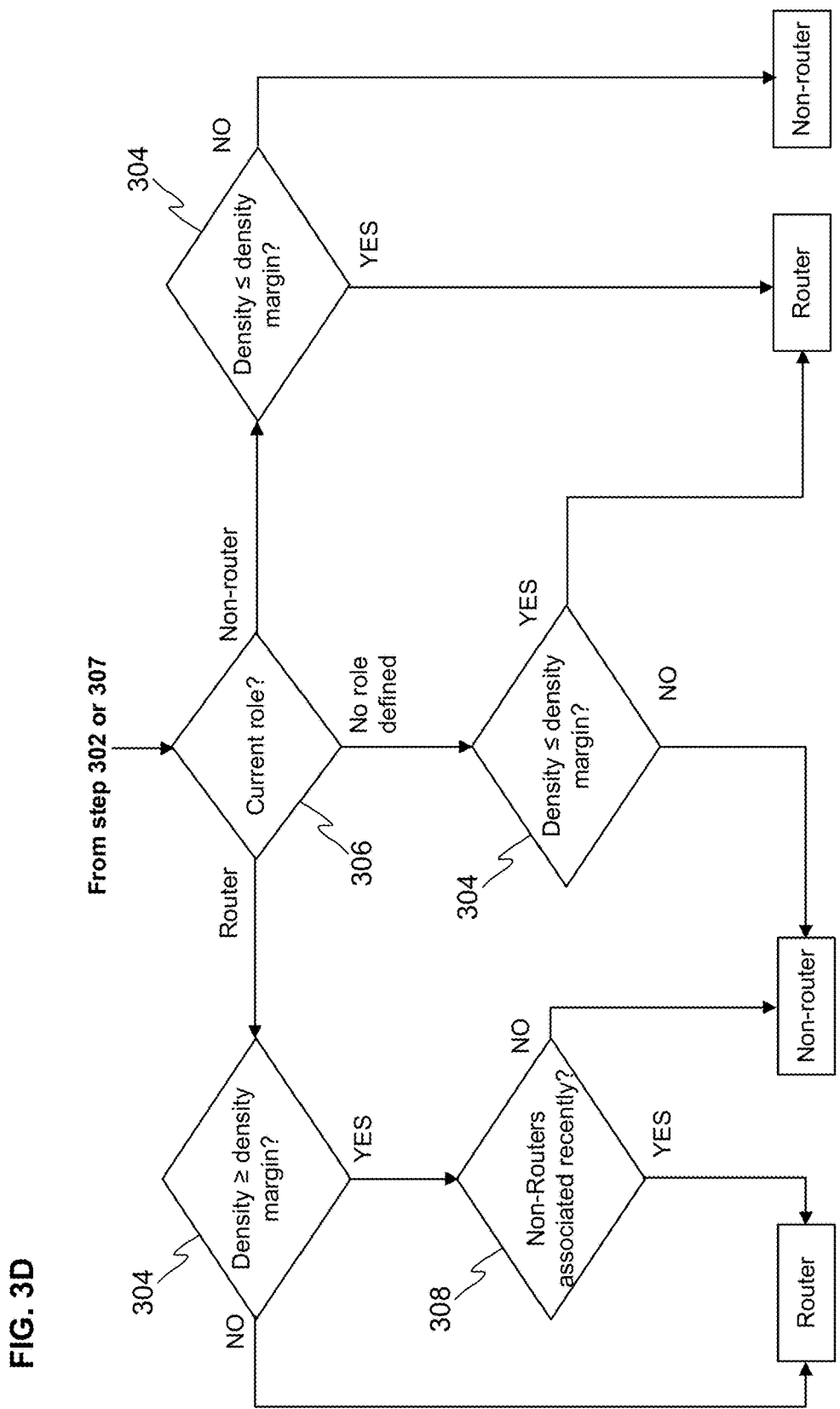

Alternatively or in addition, according to one embodiment of the invention the decision may depend on whether a router node 104 has had members, i.e. non-router nodes 106, recently. In other words, if the node is currently a router node 104 and there are one or more non-router nodes 106 that are associated with said node recently, i.e. within a predefined preceding time interval, e.g. in the last five minutes, the node is not allowed to change it role from the router role to non-router role. This is illustrated in FIG. 3D, wherein at a step 308 the decision to change the role from router role to non-router role may be prevented, if there are one or more non-router nodes 106 that are associated with the node recently.

Alternatively or in addition, according to one embodiment of the invention the decision may depend on whether a router node 104 has a route to a sink node 102 and further whether one or more of its neighbor nodes in router role do not have a route to a sink node 102. If a router node 104 has a route to a sink node 102, but one or more of its neighbor nodes in router role do not have a route to a sink node 102, the node is not allowed to change it role from the router role to non-router role. This is illustrated in FIG. 3E, wherein at steps 309 and 310 the decision to change the role from router role to non-router role may be prevented, if the node has a route to a sink node 102 and further there are one or more of its neighbor nodes in router role that do not have a route to a sink node 102. The steps 309 and 310 may be performed also after performing the step 308, if at the step 308 it is defined that there are no non-router nodes 106 that are associated with the node recently. Alternatively, the step 308 may be performed after the steps 309 and 310, if at the steps 309 and 310 it is defined that the node does not have a route to a sink node 102 or there are one or more of its neighbor nodes in router role having a route to a sink node 102.

Figure 3F:
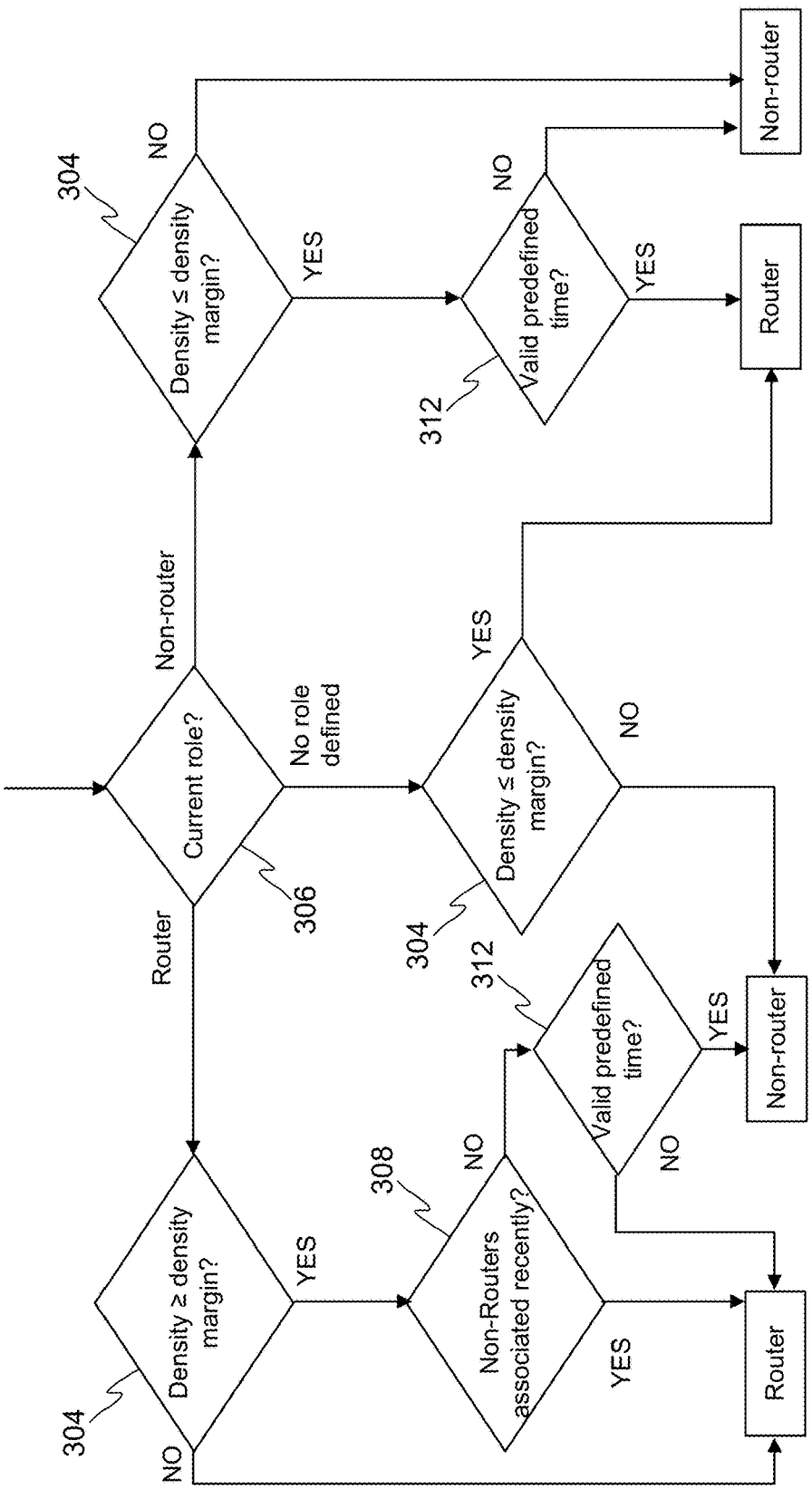

Alternatively or in addition, according to one embodiment of the invention the decision to change the role needs to be valid at least predefined time before performing the role change. In other words, the role change process is performed, e.g. steps 304, 308, and/or 310, one or multiple times during a predefined time before changing the role of the node and if the decision to change the role has been valid every time during the predefined time, the role change may be performed. Otherwise the role change will be prevented. This is illustrated in FIG. 3F at a step 312, wherein the step 312 is performed after the step 308. However, this embodiment may be combined with any of the above presented embodiments so that the step 312 may be performed after making the decision to change the role of the node in any of the above presented embodiments. For example, the step 312 may be performed after the step 304 in the embodiment illustrated in FIG. 3A. The predefined time may be the same or different for the role change from the router node to the non-router node and for the role change from the non-router node to the router node. Additionally, the predefined time may be different depending on the node type, such as whether node is mains or battery powered.

Figure 4:
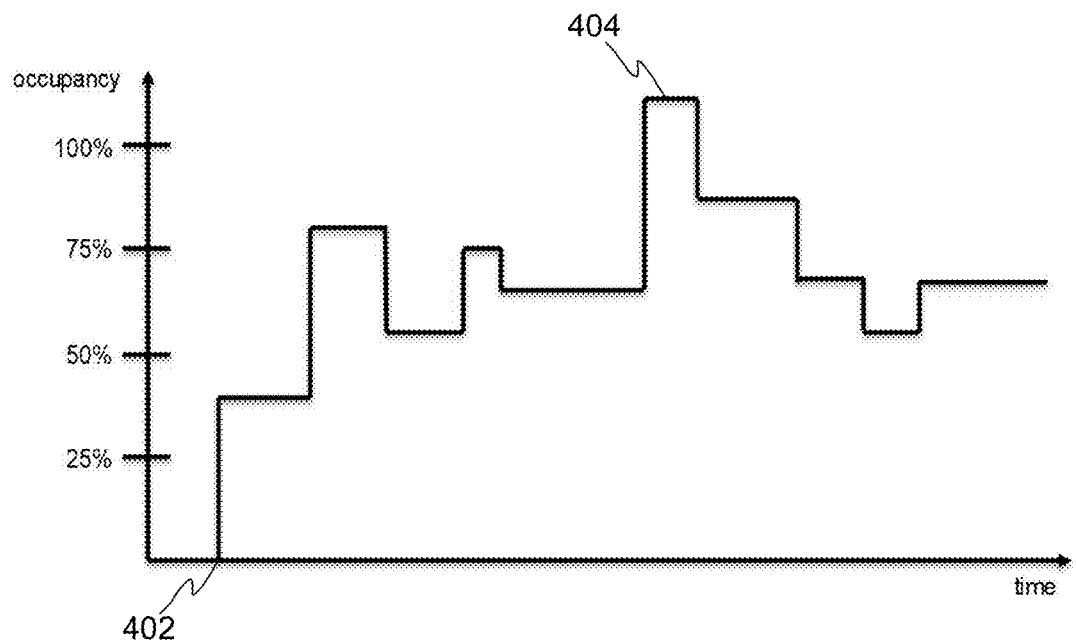
FIG. 4 illustrates an example of router density changes in a wireless mesh network.

FIG. 4 illustrates an example how a local density of router nodes 104 in a network 100 may vary, i.e. change, over the time, i.e. FTDMA table occupancy level. In the beginning 402, i.e. when the nodes are switched on, the number of router nodes 104 increases, and likely goes somewhat above a desired level, i.e. level that is optimal for the network 100. The number of the router nodes 104 stabilizes, but later even large changes may be possible. For example, in the example of FIG. 4 the high peak 404 goes above 100% occupancy, which means that some of the SF slots are temporarily double-reserved.

As discussed above each of the plurality of radio nodes 104, 106 of the network 100 may perform the role selection method steps independently. In normal system operation the sink node 102 will permanently maintain its operation as sink, as otherwise the connection to the external network is lost. However, in case that the internet connection from sink node 102 is lost, the sink node 102 may perform role selection and turn itself as non-router node 106. The connection to the internet may be provided by using Ethernet cabling, which may suffer from broken cable or interface device malfunction. Alternatively, internet connection may be provided by using wireless communication solution such as LTE, which may suffer from loss of radio coverage or device malfunction. In such case that sink node 102 decides to operate as non-router node 106 the data accumulated and generate by the node is re-routed towards other sink node 102 or the wireless mesh network 100.

Figure 5:
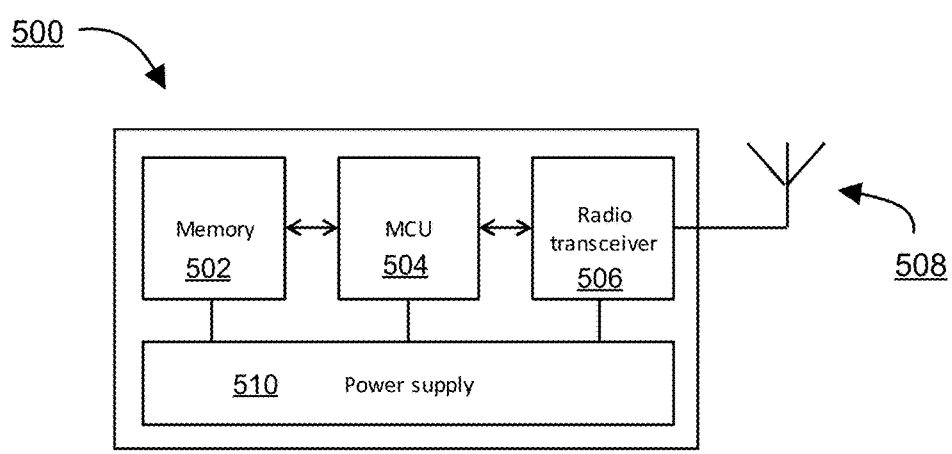
FIG. 5 illustrates schematically an example of a hardware architecture of a radio node device according to the invention.

FIG. 5 illustrates schematically an example of a hardware architecture of a radio node device 500 according to the invention. The node device (apparatus) 600 comprises a memory 502, microcontroller unit (MCU) 504, a radio transceiver 506, antenna 508, and a power supply 510. The node device 500 may be a mesh-enabled radio node device, whereupon it may be a router node 104, a non-router node 106, it may be a BLE node device. The MCU 504 is used to run a computer program (code) for a possible application and communication protocol. The node device 500 uses the radio transceiver 506 in order to transmit and receive data between other node devices 500 and/or the sink (gateway) device(s) 102, and to transmit communication frames via the antenna 508. The power supply 510 comprises components for powering the device, e.g. a battery and a regulator.

The memory 502 comprises the computer program, which is configured to perform at least the actions of the node 104, 106, 500 presented in this description part, when it is run in a computer, e.g. in the node 104, 106, 500 by means of the MCU 504.

Such action may be the detection 302 of density of the router nodes 104 within the neighbourhood of the node device 500 by using the MCU 504.

In addition, such action may be the reception of data from at least one other node 102, 104, 106, 500 and the transmission of the received data at least one other node 102, 104, 106, 500 by using the radio transceiver 506.

In addition, such action may be the production of a bi-directional radio communication with at least one another radio node device 102, 104, 106, 500 by using the radio transceiver 506.

In addition, such action may be the decision 304 based on the detected density whether to operate as a router node 104 or as a non-router node 106 by using the MCU 504.

In addition, such action may be the definition 306 of the current role of the node by using the MCU 504.

In addition, such an action may be the comparison of the detected density to a density margin to make the decision of the possible role change by using the MCU 504.

In addition, such action may be the scaling of the density margin with one or more hysteresis values to mitigate unnecessary role changes by using the MCU 504.

In addition, such action may be the definition of the node specific route cost and the scaling of the density margin with the node specific route cost by using the MCU 504.

In addition, such action may be the definition of the radio interference within the neighbourhood of the node and scaling of the density margin according to the radio interference within the neighbourhood of the node by using the MCU 504.

In addition, such action may be the definition 308 whether a router node 104 has had members, i.e. non-router nodes 106, recently and prevention of the decision to change the role from the router node 104 to the non-router node 106, if there are one or more non-router nodes 106 that are associated with the node recently, by using the MCU 504.

In addition, such action may be the prevention of the decision to change the role from the router node 104 to the non-router node 106, if the node has a route to a sink node 102 and there are one or more of its neighbor nodes in router role that do not have a route to a sink node 102, by using the MCU 504.

In addition, such action may be the performing of the role change process again after a predefined time before changing the role of the node and the performing the role change, if the decision to change the role is still valid after the predefined time, by using the MCU 504.

The aforementioned actions may be performed similarly in the BLE-enabled radio node device.

The computer program may be stored in a tangible non-volatile computer readable medium, e.g. an USB stick or a CD-ROM disc.

The role selection method according to the invention discussed above improves adaptivity of a wireless communication network system, which in turn improves, i.e. optimizes, the operation of the network. Furthermore, the number of router nodes in the network 100 may be optimized, which in turn allows efficient usage of spectrum recourses. In addition, the connectivity of the wireless communication network may be maintained by having an adequate number of router nodes, while the rest of the nodes may use more power optimized operating principles. Furthermore, the role selection method enables that the edges and sparse parts of the network may be taken into account so that the coverage remains good and new nodes may find the network more likely. Moreover, the solution according to the invention is relatively simple to implement.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A wireless communication system (100), comprising:
a plurality of radio nodes, each of the plurality of radio nodes being able to operate at least as a router node (104) or as a non-router node (104), wherein each of the plurality of radio nodes is configured to:
detect density of the router nodes (104) within its neighbourhood, and
make a decision based on the detected density whether to operate as a router node (104) or as a non-router node (106),
wherein the decision is provided by comparing the detected density to a scalable density margin, and
wherein the density margin is scaled with one or more hysteresis values to mitigate unnecessary role changes.

2. The system (100) according to claim 1, wherein the decision is dependent on the current operating role of said node.

3. The system (100) according to claim 2, wherein the density of the router nodes (104) is defined as a ratio between number of occupied superframe, SF, slots per access cycle (206) and number of all SF slots per access cycle (206) in a Frequency-Time Division Multiple Access, FTDMA, table.

4. The system (100) according to claim 2, wherein the decision to change the role from router node to non-router node is prevented, based on the node having a route to a sink node (102), and there are one or more neighbour nodes in router role that do not have a route to a sink node (102).

5. The system (100) according to claim 1, wherein the density margin has a common value throughout the system.

6. The system (100) according to claim 1, wherein the density margin is scaled with a node specific route cost, decreasing or increasing a probability of said node to choose the router role.

7. The system (100) according to claim 6, wherein a probability of said node to choose the router role decreases, when the route cost increases.

8. The system (100) according to claim 5, wherein the density margin is scaled with a node specific route cost, decreasing or increasing a probability of said node to choose the router role.

9. The system (100) according to claim 1, wherein the density margin is scaled according to radio interference within the neighbourhood of the node, decreasing or increasing a probability of the node to choose the router role and decreasing or increasing the router density within the neighbourhood of the node.

10. The system (100) according to claim 1, wherein the decision to change the role has been valid at least predefined time before performing the role change.

11. The system (100) according to claim 1, wherein the density of the router nodes (104) is defined as a ratio between number of occupied superframe, SF, slots per access cycle (206) and number of all SF slots per access cycle (206) in a Frequency-Time Division Multiple Access, FTDMA, table.

12. The system (100) according to claim 1, wherein the decision to change the role from router node to non-router node is prevented, if the node has a route to a sink node (102), and there are one or more neighbour nodes in router role that do not have a route to a sink node (102).

13. A radio node device (104, 106, 500) for wireless communication system (100), being able to operate at least as a router node (104) or as a non-router node (106) and comprising:
- a microcontroller (504), and
- a radio transceiver (506), wherein,
- the radio node device (102, 104, 106, 500) is configured to:
  - detect, by the microcontroller (504), density of the router nodes (104) within its neighbourhood, and
  - make a decision, by the microcontroller (504), based on the detected density whether to operate as a router node (104) or as a non-router node (106),
- wherein the decision is provided by comparing the detected density to a scalable density margin, and
- wherein the density margin is scaled with one or more hysteresis values to mitigate unnecessary role changes.

14. A role selection method for the radio node device (104, 106, 500) of claim 13 in a wireless communication system (100), wherein the method comprises:
- detecting (302), by the microcontroller (504), density of the router nodes (104) within its neighbourhood, and
- making a decision (304), by the microcontroller (504), based on the detected density whether to operate as a router node (104) or as a non-router node (106),
- wherein the decision is provided by comparing the detected density to a scalable density margin, and
- wherein the density margin is scaled with one or more hysteresis values to mitigate unnecessary role changes.

15. A non-transitory computer readable medium having stored thereon a computer program that when executed by a computer processor causes the method of claim 14 to be performed.

16. A non-transitory computer readable medium comprising a computer program that when executed by the microcontroller causes the method of claim 14 to be performed.

* * * * *